US012762324B2

(12) United States Patent
Munoz et al.

(10) Patent No.: US 12,762,324 B2
(45) Date of Patent: Oct. 13, 2026

(54) ENHANCED GENERATION OF FORMATTED AND ORGANIZED GUIDES FROM UNSTRUCTURED SPOKEN NARRATIVE USING LARGE LANGUAGE MODELS

(71) Applicant: MICROSOFT TECHNOLOGY LICENSING, LLC, Redmond, WA (US)

(72) Inventors: Mollie Elizabeth Munoz, Redmond, WA (US); Nicole Elaine Berdy, Cambridge, MA (US); Jennifer Fox, Seattle, WA (US); Adrian Wyatt Bonar, Seattle, WA (US); Thomas Richard Fitzmacken, Seattle, WA (US); Devis Lucato, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 18/457,086

(22) Filed: Aug. 28, 2023

(65) Prior Publication Data

US 2024/0386185 A1 Nov. 21, 2024

Related U.S. Application Data

(60) Provisional application No. 63/467,795, filed on May 19, 2023.

(51) Int. Cl.
*G06F 3/048* (2013.01)
*G06F 16/355* (2025.01)
(Continued)

(52) U.S. Cl.
CPC .......... *G06F 40/106* (2020.01); *G06F 16/355* (2019.01); *G06F 16/382* (2019.01); *G06F 40/30* (2020.01)

(58) Field of Classification Search
CPC .... G06F 40/106; G06F 16/355; G06F 16/382; G06F 40/30; G06F 40/103
See application file for complete search history.

(56) References Cited

U.S. PATENT DOCUMENTS 9,460,088 B1 10/2016 Sak et al.
11,783,112 B1 * 10/2023 Fan ...................... G06F 16/345 715/234

(Continued)

FOREIGN PATENT DOCUMENTS

WO 2014018039 A1 1/2014

OTHER PUBLICATIONS

International Search Report and Written Opinion received for PCT Application No. PCT/US2024/026117, Aug. 23, 2024, 13 pages.

(Continued)

*Primary Examiner* — Rashawn N Tillery
(74) *Attorney, Agent, or Firm* — Scott Y. Shigeta; Newport IP, LLC

(57) ABSTRACT

The disclosed techniques provide enhanced generation of formatted and organized guides from unstructured spoken narrative using a large language model. A system uses unstructured verbal narrative as input in place of written input. The system uses a large language model to organize an unstructured narrative into a structured guide that follows specific formatting requirements. For example, the formatting requirements may define specific headers, steps, bullets, image locations, etc. The formatting requirements may also define category requirements. For example, category requirements may indicate that a structured guide is to include a title, topics for each header, etc. The system can also suggest new categories, relevant explanations, additional image locations, and other references the author may not have considered. The process is automated, resulting in (Continued)

a complete guide having a consistent structure in a particular format.

20 Claims, 15 Drawing Sheets

(51) Int. Cl.

| | |
|---|---|
| ***G06F 16/38*** | (2019.01) |
| ***G06F 40/106*** | (2020.01) |
| ***G06F 40/30*** | (2020.01) |

(56) References Cited

U.S. PATENT DOCUMENTS

| | | | | |
|---|---|---|---|---|
| 12,067,039 | B1 * | 8/2024 | Campos | G06V 30/412 |
| 12,511,301 | B1 * | 12/2025 | Cetoli | G06F 16/24578 |
| 2004/0172245 | A1 * | 9/2004 | Rosen | G06F 40/174<br>704/235 |
| 2006/0041428 | A1 | 2/2006 | Fritsch et al. | |
| 2020/0372411 | A1 * | 11/2020 | Karp | G06F 40/205 |
| 2021/0144251 | A1 * | 5/2021 | Chen | G10L 25/63 |
| 2023/0060252 | A1 * | 3/2023 | Bly | G06F 18/285 |
| 2023/0281248 | A1 * | 9/2023 | Schalkwyk | G06F 16/7844<br>707/749 |
| 2023/0315983 | A1 * | 10/2023 | Seth | G06N 3/091<br>704/9 |
| 2024/0311546 | A1 * | 9/2024 | Maschmeyer | G06F 40/166 |
| 2024/0362278 | A1 * | 10/2024 | PerezLeon | G06F 40/40 |
| 2024/0362409 | A1 * | 10/2024 | Kuan | G06F 40/30 |

OTHER PUBLICATIONS

"Research Paper Writing Using Chat GPT Open AI | Thesis Writing Using Chat GPT | Paper Writing", Retrieved From: https://www.youtube.com/watch?v=ymj6p0wNKyo, Feb. 4, 2023, 2 Pages.

Huang, et al., "Improving Speech-to-Text Transcripts From Amazon Transcribe Using Custom Vocabularies and Amazon Augmented AI", Retrieved From: https://aws.amazon.com/blogs/machine-learning/improving-speech-to-text-transcripts-from-amazon-transcribe-using-custom-vocabularies-and-amazon-augmented-ai/, Aug. 3, 2020, 22 Pages.

Jangid, Ajay, "Transforming Unstructured Text into Structured Insights with NLP Techniques", Retrieved From: https://medium.com/@jangidajay271/transforming-unstructured-text-into-structured-insights-with-nlp-techniques-f0537583f563, Feb. 4, 2023, 8 Pages.

Rocha, Roberto, "Getting Tabular Data From Unstructured Text With GPT-3: An Ongoing Experiment", Retrieved From: https://robertorocha.info/getting-tabular-data-from-unstructured-text-with-gpt-3-an-ongoing-experiment/, Retrieved Date: Feb. 16, 2023, 23 Pages.

Yuan, et al., "Wordcraft: Story Writing With Large Language Models", In Proceedings of the 27th International Conference on Intelligent User Interfaces, Mar. 21, 2022, pp. 841-852.

International Preliminary Report on Patentability (Chapter I) received for PCT Application No. PCT/US2024/026117, mailed on Dec. 4, 2025, 08 pages.

* cited by examiner

ENHANCED GENERATION OF FORMATTED AND ORGANIZED GUIDES FROM UNSTRUCTURED SPOKEN NARRATIVE USING LARGE LANGUAGE MODELS

CROSS REFERENCE TO RELATED APPLICATION

This patent application claims the benefit of U.S. Provisional Patent Application Ser. No. 63/467,795 filed May 19, 2023, entitled "ENHANCED GENERATION OF FORMATTED AND ORGANIZED GUIDES FROM UNSTRUCTURED SPOKEN NARRATIVE USING LARGE LANGUAGE MODELS," which is hereby incorporated in its entirety by reference.

BACKGROUND

Tutorials and guides are critical for onboarding a user to a new product or service. For example, a site may provide user manuals for a software application. A site may require authors to follow a specified structure for each published document. By providing documents that follow a specific format, a site can improve the readability and effectiveness of its documents, protect their brand, and improve user interactions with products and services.

Authors and managers for sites that provide formatted documents can face a number of challenges. For example, authors have to take the time to read and understand the site's formatting requirements. Formatting requirements can include, but are not limited to, text layout parameters, word limitations, image placement parameters, etc. Thus, in addition to taking the time to formulate accurate content, authors must be mindful of the formatting requirements as they compose documents. These requirements add to the difficulty of composing formatted documents, particularly if a person is not part of a particular content team. When authors work with different teams, authors may have to adjust their writing style in their effort to accommodate unfamiliar formatting requirements.

These issues can be further exacerbated by the fact that an author may have to create similar content for different sites. Such scenarios require authors to go through a number of tedious and time-consuming processes to generate different versions of the same content. Such processes are not scalable nor are they economically feasible. Accuracy can also be an issue since human error will always be a part of manual processes for generating documents.

Also, when documents are manually drafted using existing systems, there may be an issue with consistency between different documents on a particular site. When a number of different authors generate documents for a particular site, each author may have different levels of accuracy or they may have different interpretations of the formatting requirements. This can lead to a library of manuals that have different levels of detail, different formats, etc. When a site has documents that do not consistently follow a given formatting requirement, the readability and usability of the documents may fall below acceptable standards. This can lead to user errors, misuse of a product or service, and other inefficiencies with respect to a site and the use of its computing resources.

SUMMARY

The disclosed techniques provide enhanced generation of formatted and organized guides from unstructured spoken narrative using a large language model. A system uses unstructured verbal narrative as input in place of a written input. The system uses a large language model to organize an unstructured narrative into a structured guide that follows specific formatting and category requirements. For example, the formatting requirements may define specific headers, steps, bullets, image locations, etc. The formatting requirements may be interpreted from an existing document that is used as fine-tuning data, or the formatting requirements may also be determined by an analysis of the verbal narrative. The system can identify categories, e.g., topics, to generate the formatted and organized guides. The categories can be determined by an analysis of the verbal narrative. The system can also suggest new categories, relevant explanations, image locations, and other references the author may not have considered. The process is automated, resulting in complete formatted and organized guides ready for review. Completed formatted and organized guides can also be edited by a user.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
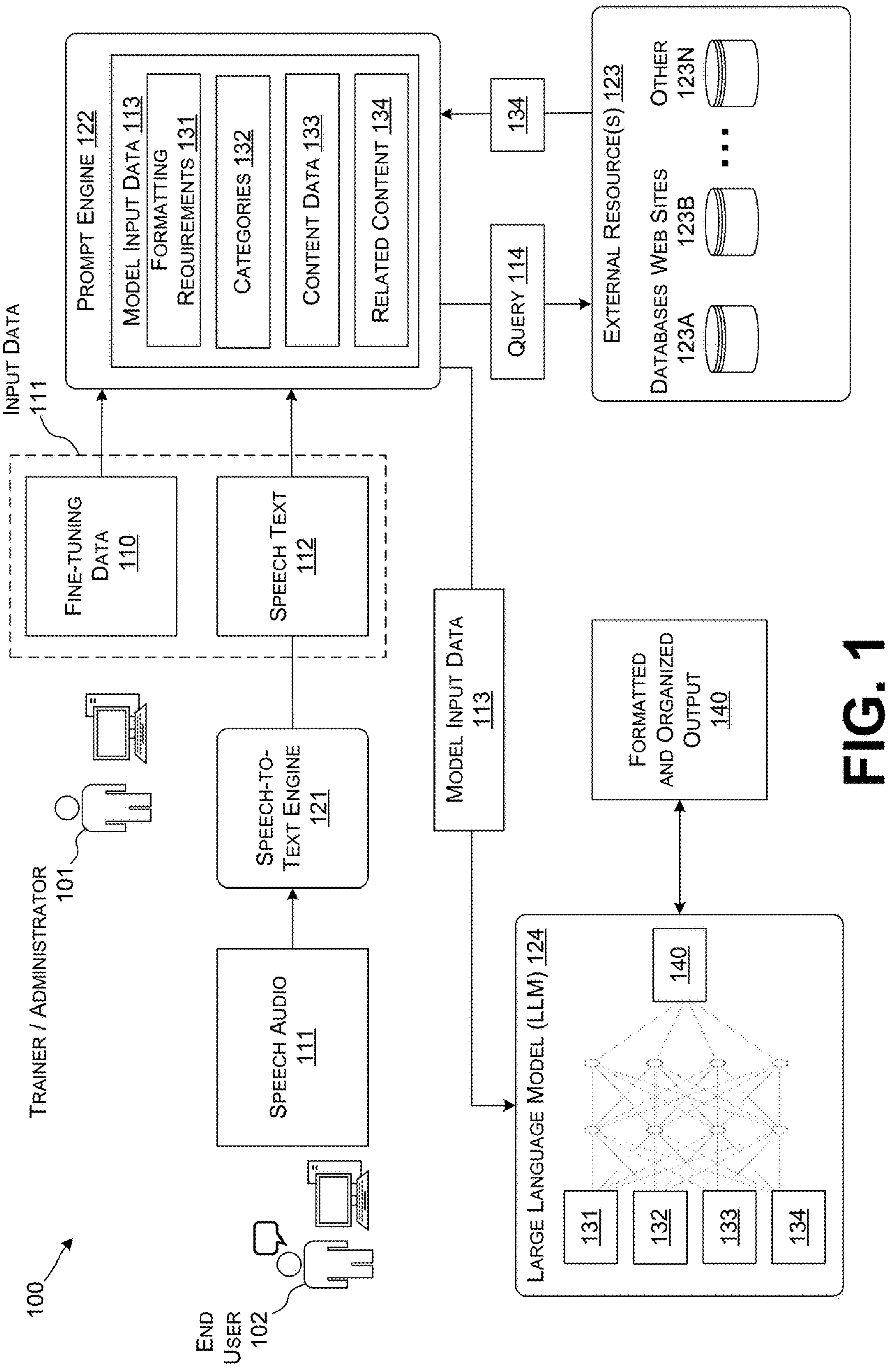
FIG. 1 is a block diagram of a system for providing enhanced generation of formatted and organized guides from unstructured spoken narrative using a large language model.

FIG. 1 illustrates a system 100 that provides enhanced generation of formatted and organized guides 140 from unstructured spoken narrative using a large language model. In some configurations, the system 100 can receive and analyze fine-tuning data 110 to determine formatting requirements 131 that will be used to determine a layout of formatted and organized guides 140 that are generated from unstructured spoken narrative. In one example, the fine-tuning data 110 can be in the form of an existing document, such as a formatted and organized guide that describes how to use a product or service. This allows a system administrator 101 to train the system on how to generate documents having a preferred format by simply providing a document having a desired layout. Thus, instead of requiring the administrator to manually enter specific rules and policies for each document format, the administrator can provide one or more documents that follow a specific document layout, e.g., a document having titles, headers and content in a particular format, font style, font size and/or colors. The document can also have images that are arranged according to specific parameters. The system can analyze the document to determine preferred formats for each document section, preferred image sizes, image positions, and other image characteristics. As will be described in more detail below, the system can also interpret other forms of fine-tuning data 110, such as voice commands and gestures to determine one or more formatting requirements. Once the system receives and processes the fine-tuning data 110, the system can generate new guides 140 that follow the format and organization of the fine-tuning data 110 while also including select content and categories that are included in an unstructured spoken narrative provided by an end user 102.

The system can receive the unstructured spoken narrative in the form of a speech audio input 111 from the end user 102. The speech audio input 111 can subsequently be converted into speech text 112 by the use of a speech engine 121. This conversion can occur at regular intervals or the system 100 can continuously gather the speech audio input 110 as the end user 102 speaks and generate the speech text 112 until the end user 102 pauses and/or stops speaking.

The speech text 112 can then be processed by a prompt engine 122 to generate model input data 113. The model input data can include formatting requirements 131, one or more categories 132, content data 133, and related content 134. As described above, the prompt engine 122 can generate the formatting requirements 131 from an analysis of the fine-tuning data 110. The prompt engine 122 can generate the categories 132 and content data 133 from an analysis of the unstructured spoken narrative. The categories and select content from the unstructured spoken narrative can be based on predetermined keywords or predetermined phrases identified in the unstructured spoken narrative. In addition, the system can also analyze the unstructured spoken narrative to determine a sentiment. Thus, the prompt engine can parse what the user 112 is literally saying as well as sentiment and emotion implied in the unstructured spoken narrative. For instance, the sentiment can be based in part on the word choice in the unstructured spoken narrative. In addition, subtleties such as inflections, tone of voice, and speaking volume can also be used to determine a sentiment. The determined sentiment can be used to generate either formatting requirements 131, one or more categories 132 or content data 133.

The end user 102 can speak naturally about a product or service. In one illustrative example, the end user can describe the general steps of how to use a software application. The system 100 can analyze the speech audio 111 from the end user and generates data defining categories 132. The categories can define topics that will be used for the final output 140. The determined categories can include, for example, categories such as: Procedures, Tools, Materials, Going Further, etc. The system 100 also identifies select content from the natural language input that corresponds to each category. For example, the natural language input may include a verbal narrative describing steps on how to operate a software application. The system may then associate such content with a category, e.g., a Procedures category.

In some embodiments, the system can also pull in references that were not part of the speech audio input 111 but are related to items mentioned in the speech audio input 111. In such embodiments, the system may generate one or more queries 114 and send those queries to external resources 123, e.g., databases 123A, web sites 123B, and other resources 123N. Those resources 123 can return related content 134 containing the references. The system can then generate model input data 113 comprising the formatting requirements 131, categories 132, content data 133, and the related content 134. The model input data 113 can then cause the large language model 124 to generate the output 140 in a format that provides a consistent structure. In some embodiments, the output 140 is in a markdown format.

Referring now to FIGS. 2A-2E, an embodiment of the system that can generate a formatted output 140 from unstructured verbal narrative and fine-tuning data is shown in described. In this example, the fine-tuning data is in the form of a formatted document, e.g., a formatted guide for a particular site. The fine-tuning data 110 can be received by a system administrator 101 or by another user, such as the end-user 102.

Figure 2A:
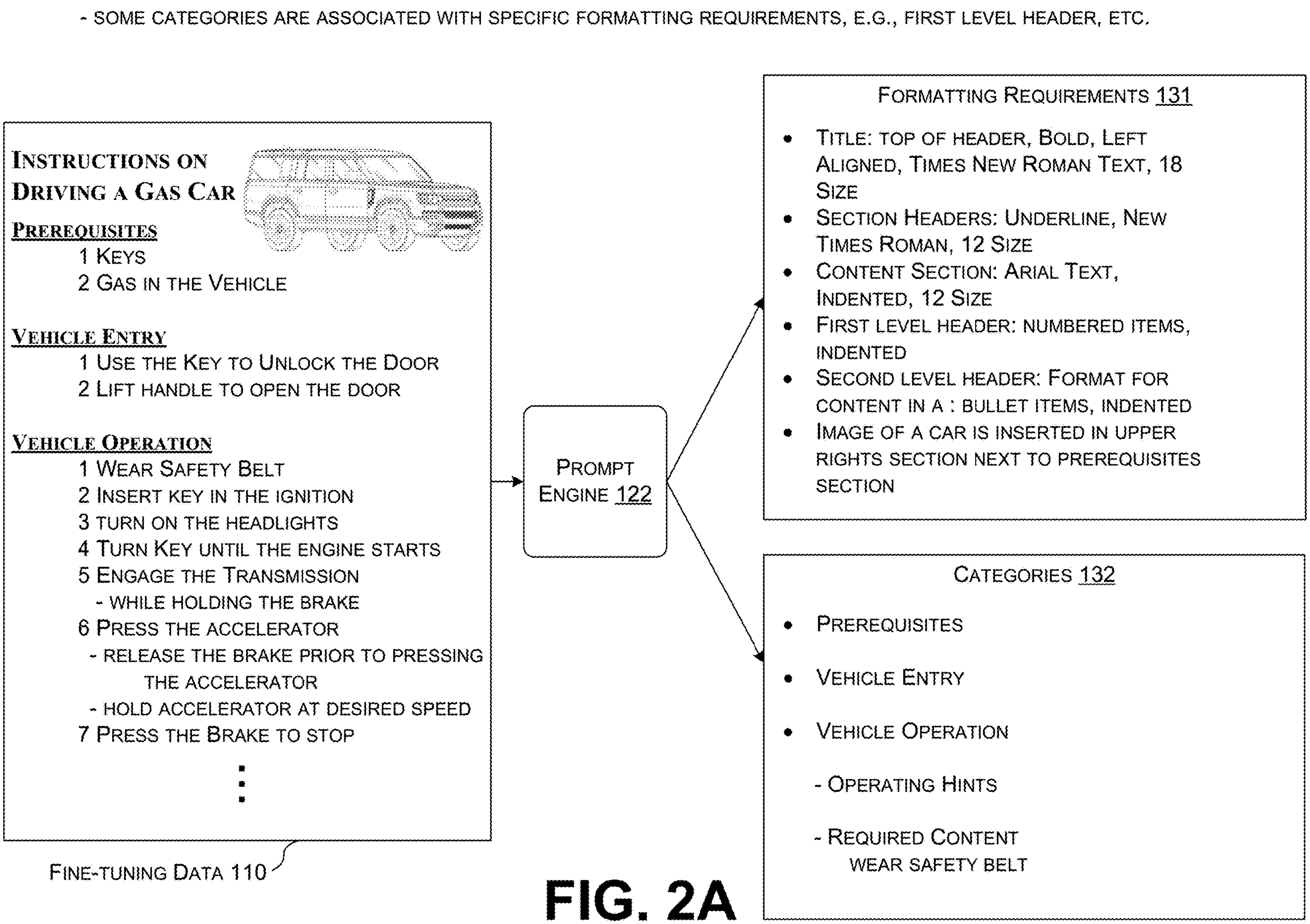
FIG. 2A shows aspects of a prompt engine generating formatting requirements and categories from fine-tuning data.

As shown in FIG. 2A, the fine-tuning data 110 can a layout that follows one or more formatting requirements. In particular, this example has a title that is left aligned, in a first font size, and is in bold text. The section headers (categories) are in a second font size, in bold text and underlined. Each level of each section also has different formats, e.g., a first level uses numbered paragraphs while a second level uses bullet points. The fine-tuning data 110 also comprising individual sections of content associated with individual categories. For example, keys and gas are associated with a Prerequisite section.

The prompt engine 122 can identify formatting requirements from the fine-tuning data 110, e.g., an example document, and identify the format of the title, headers, and content. The prompt engine 122 can also identify image locations and other characteristics of the image, e.g., a transparency level, color characteristics, border characteristics, etc. The prompt engine 122 can determine one or more formatting requirements 131 based on a layout and/or format of content of the fine-tuning data 110. Thus, the prompt engine 122 can analyze the document and identify a font type, font size, text formats, etc. The layout of the document can be dependent on spacing, paragraph positions, margins, etc. Such characteristics of the document can be interpreted by the system and recorded as formatting requirements 131.

The prompt engine 122 can also analyze the fine-tuning data 110 to also identify categories 132. The prompt engine 122 can select certain sections of text as categories. The sections of text that are selected as a category can have a predetermined format, such as bolded text, left aligned text, etc. The sections of text that are selected as a category can also include predetermined keywords, such as words like "prerequisites," "operations," etc. In this example, the system determined that the fine-tuning data included several categories, e.g., Prerequisites, Vehicle Entry, Vehicle Operation, Operating Hints, Required Content, etc. Individual categories may also have an associated level, e.g., the "Prerequisites" category may be at a first level, while the Operating Hints category may be at a second level. Each level may also have a different format.

The prompt engine 122 can also analyze the fine-tuning data 110 to determine one or more format requirements. For instance, the fine-tuning data 110 may be in the form of a document having an image in the upper right corner. In response to receiving this type of fine-tuning data 110, the system may generate format requirements indicating that an image in the upper right corner of a document is required. Such requirements can also include properties, such as images having a particular resolution, size, etc.

After the pre-training data is used to generate the formatting requirements and categories, the system can receive an unformatted speech input from the end user to generating another document having new content but also having a format similar to the fine-tuning data 110. In this example, the fine-tuning data 110 is a document that pertains to instructions on driving a gas car, and the end user wishes to generate a document having a format that is similar to the fine-tuning data 110 but pertaining to instructions on driving an electric car.

Figure 2B:
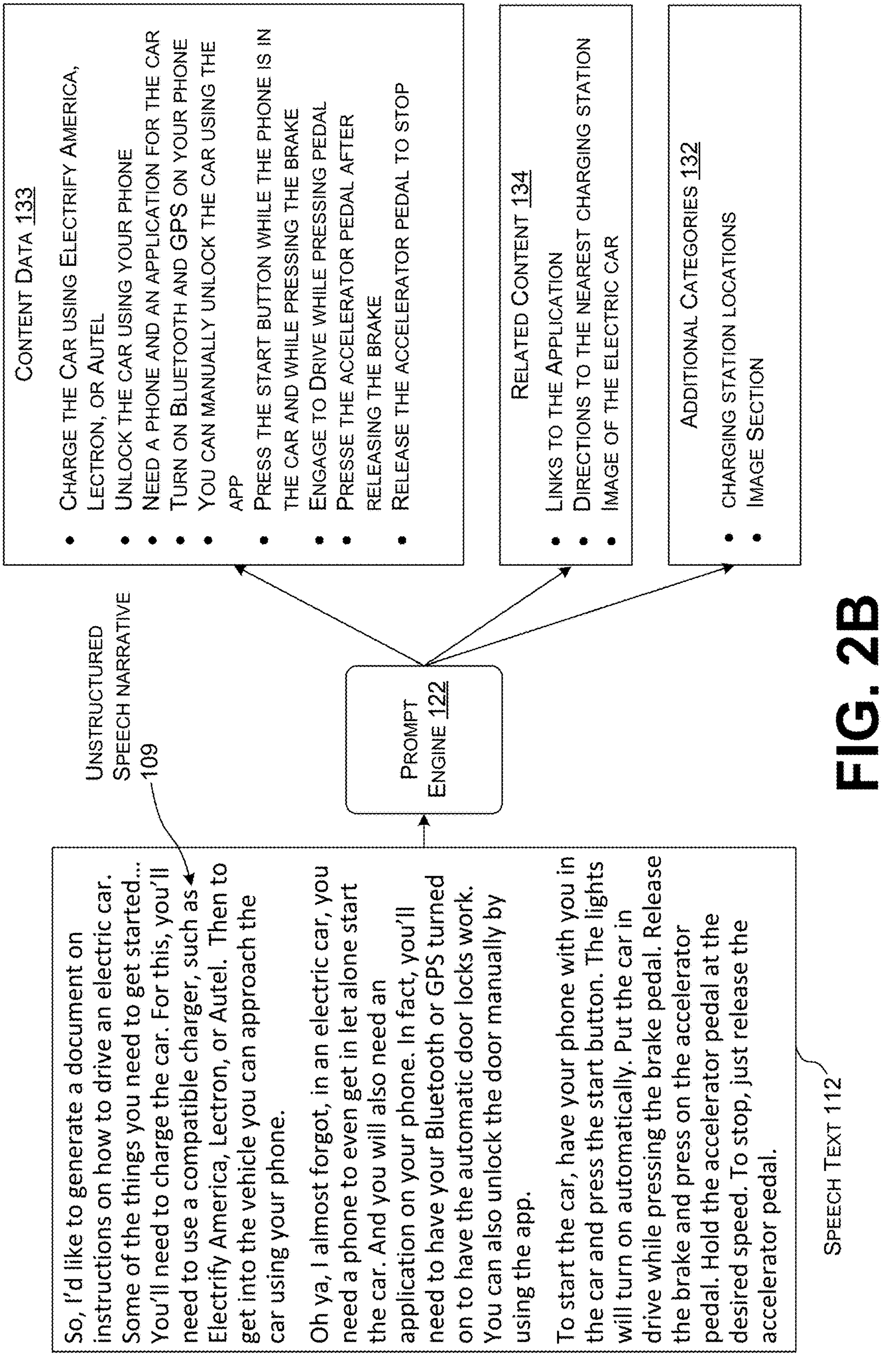
FIG. 2B shows aspects of a prompt engine generating select content and related content from a verbal input.

As shown in FIG. 2B, the prompt engine 122 receives the speech text 112 of the speech audio input 111 that is received at a microphone in communication with the computing system 100. As shown, the speech text 112 includes unstructured verbal narrative 109. In this example, the unstructured verbal narrative 109 describes different aspects of instructions on how to drive an electric car but the instructions are not in a particular order. As described in more detail below, the prompt engine 122 can select individual sections of the unstructured verbal narrative 109 and associate each individual section with individual categories and re-order the individual sections.

The prompt engine 122 can identify the select content from the unstructured verbal narrative. For example, the system may identify specific steps on how to operate a car, prerequisites for driving a car, etc. This can be achieved by identifying individual sections of select content 133 that may match with specific combinations of keywords or by the use of instructions a large language model. For example, the system may provide the speech text 112 to a large language model along with instructions to identify operating steps or prerequisites.

The prompt engine 122 can also identify additional categories from the unstructured verbal narrative. For example, the system may determine categories from the end user's speech, e.g., topics called "Prerequisites, Download, Operation, and Conclusion. In the example of FIG. 2B, the system may determine that additional categories are required since the fine-tuning data 110 included an image and since the unstructured verbal narrative mentioned charging stations. In this example, the prompt engine 122 also retrieved other related content 134 from other resources, such as links to an application mentioned in the verbal narrative, directions to charging stations mentioned in the verbal narrative, and image data. The image data may be retrieved from one or more resources in response to determining that the format requirements indicate an image is required. In this example, the format requirements indicate an image having particular properties and an image pertaining to a particular subject, e.g., electric cars, is required.

Figure 2C:
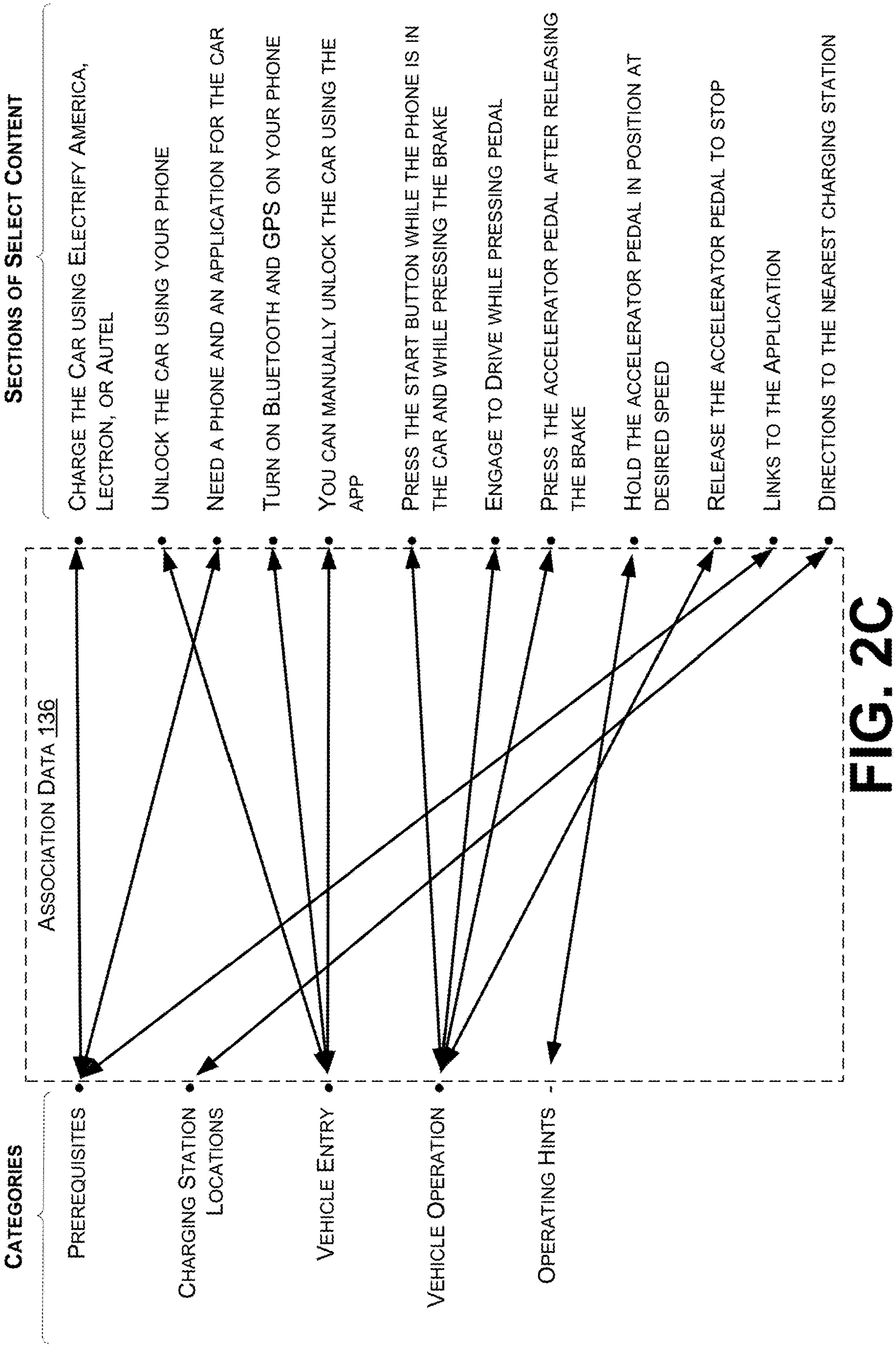
FIG. 2C shows aspects of associated data that can be generated from verbal input and determined categories.

As shown in FIG. 2C, the system associates identified content with the determined categories. In this process, the prompt engine may analyze each section of the selected content and determine the relevancy of each section with respect to a category. For instance, the system may determine that a section of the speech text 112 describing a mobile device and an application should be associated with the "Prerequisites" category based on verbal narrative stating that a "mobile device and an application are needed." As shown, the association data 136 defines the associations between each section of content and each category. This allows the system to re-order the select sections of content according to an order of the categories and/or the formatting requirements. The association data 136 can be stored in conjunction with, or within, the category data 132 or the formatting requirements 131.

The association data associates specific sections of content that are extracted from the natural language input with individual categories. The association data can also associate the related references with individual categories. For example, content extracted from the verbal narrative input that describes installation steps are categorized as "Procedures," content extracted from the verbal narrative input that describes parts of a product are categorized as "Materials," etc. The related references, e.g., the links to the applications, that are retrieved from external resources may be associated with a "Prerequisites" category, etc.

Figure 2D:
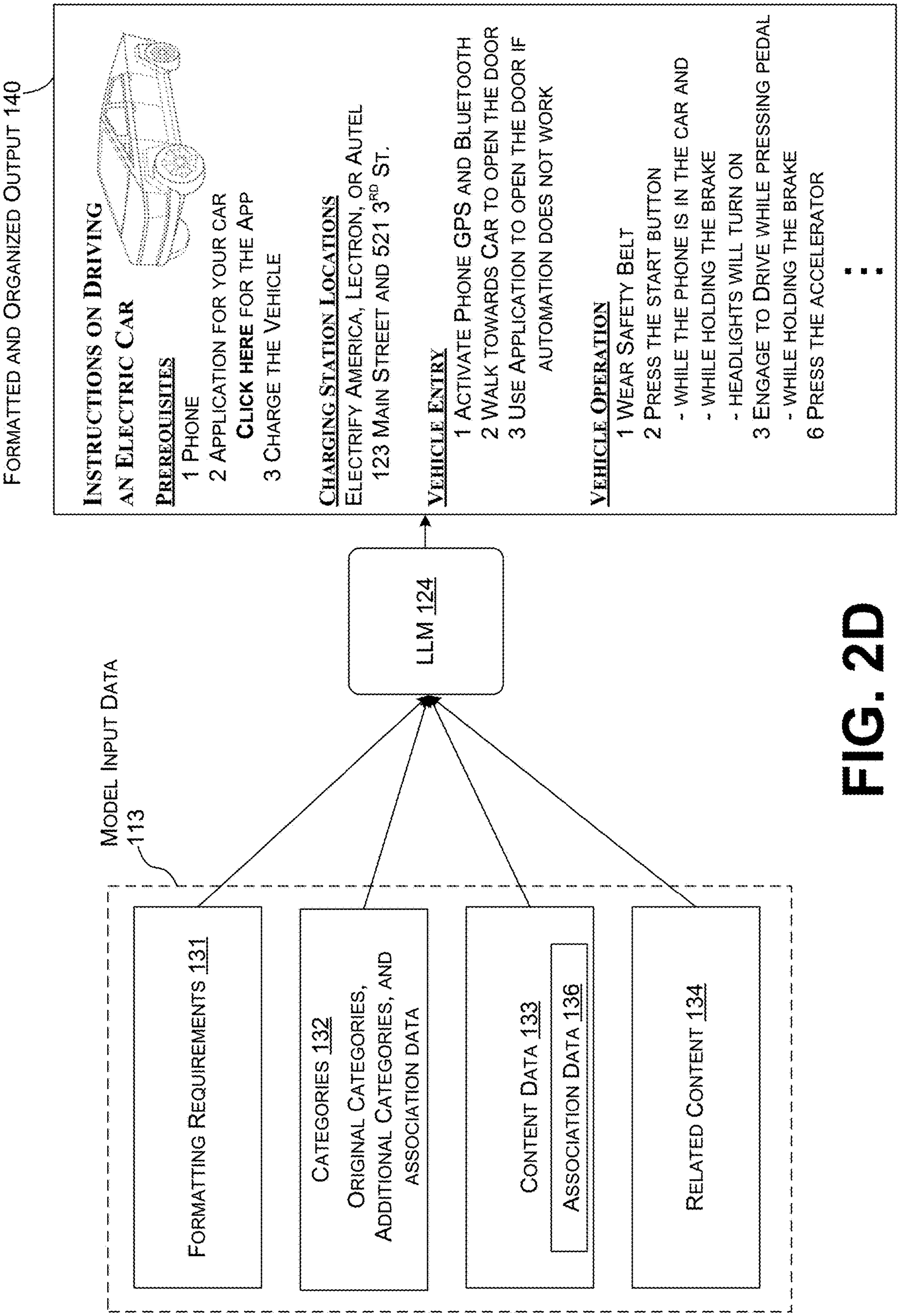
FIG. 2D shows a large language model used for generating a formatted document.

As shown in FIG. 2D, the system provides the model input data 113 to the large language model 124, which causes the large language model 124 to generate the formatted output 140. As shown, the output 140 follows the format and the categories of the fine-tuning data, while including the content and categories obtained from the unstructured speech narrative. In this example, large language model 124 receives the one or more formatting requirements 131 identified from the fine-tuning data 110, the one or more categories 132, the association data, and the individual sections of select content 133 identified from the text translation 112 of the unstructured verbal narrative 109. This model input data 113 causes the large language model 124 to generate the structured document 140. As shown, the output 140 is in the form of a structured document comprising a layout where the individual sections of select content 133 are each graphically associated with the one or more categories 132. In addition, the individual sections of select content and the one or more categories are ordered and formatted according to the one or more formatting requirements identified by the analysis of the fine-tuning data 110.

Figure 2E:
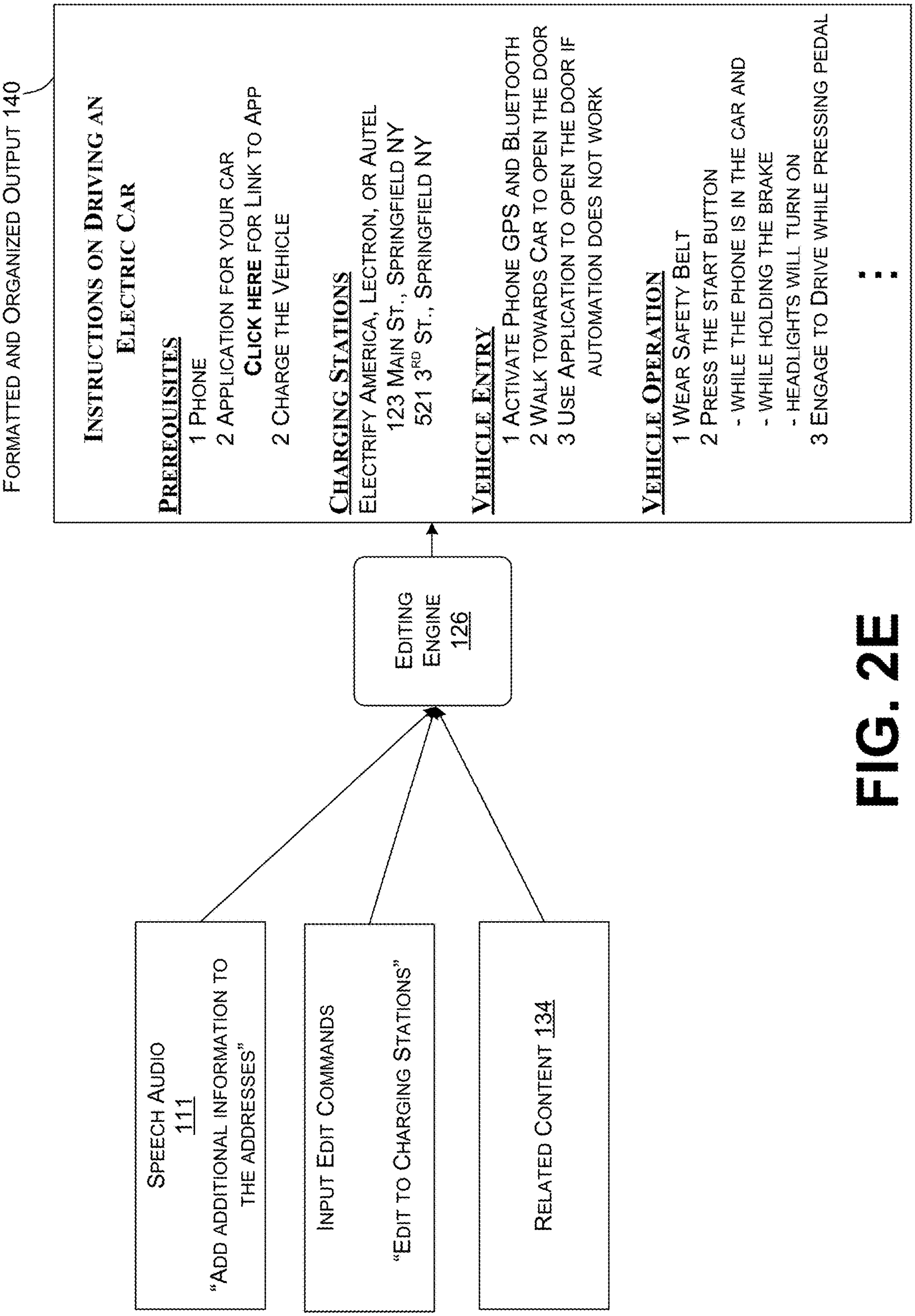
FIG. 2E shows how a formatted document can be edited.
Figure 3:
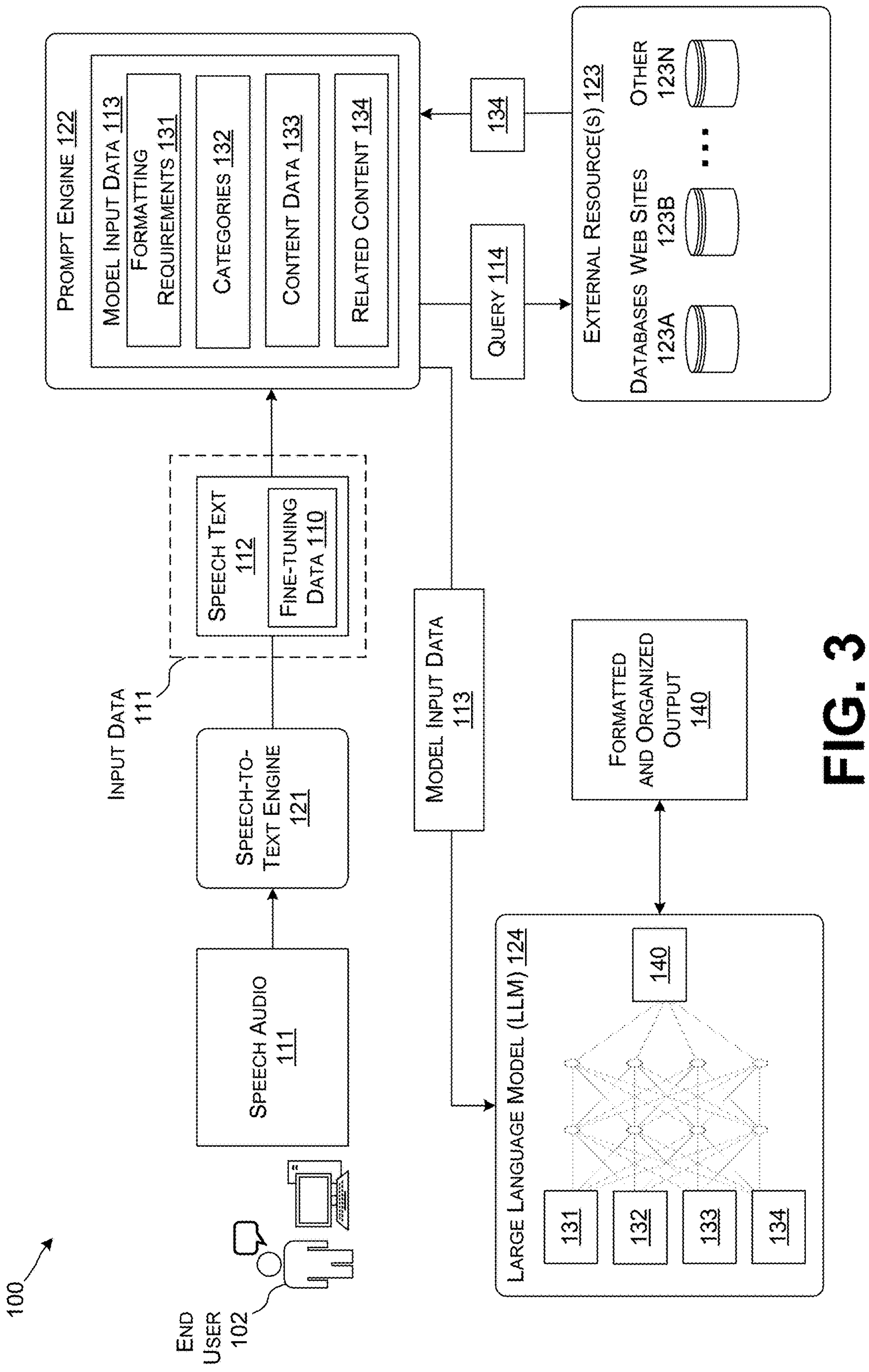
FIG. 3 is a block diagram of a system for providing enhanced generation of formatted and organized guides from unstructured spoken narrative using a large language model, where the system uses speech input for determining formatting requirements.

As shown in FIG. 2E, the system can also provide one or more tools that allows the user to edit the output file. For example, the end user can edit the format of the document title, additional information to select content, e.g., add address information to the charging station locations, and add, remove or edit images. These edits can be also used to modify the formatting requirements 131 and/or the categories 132. Thus, the system can continually learn from the user's edits so that the system can generate future documents from other verbal narrative inputs while maintaining a consistent format across all future documents.

Referring now to FIGS. 3 and 4A-4D, embodiments of the system that can generate a formatted output 140 from unstructured verbal narrative are shown in described. In this example, the system analyzes the speech text 112 of the end user to identify fine-tuning data 110. In such embodiments, the speech text 112 is analyzed to determine formatting requirements, categories, and select content for the formatted output 140. This allows the end user 102 to speak naturally about a product or service and also insert comments about how they would like a document to be formatted.

Figure 4A:
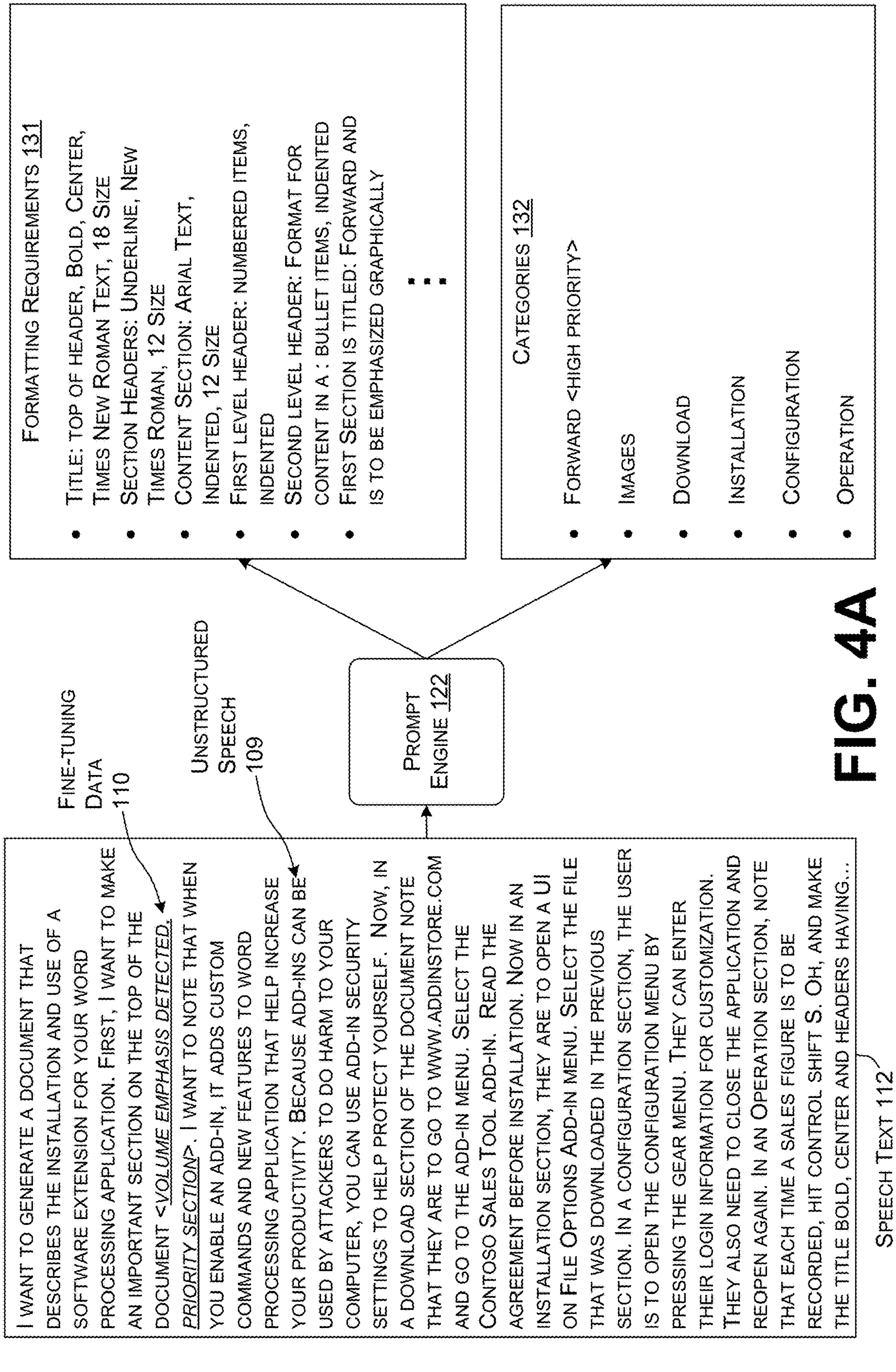
FIG. 4A shows aspects of a prompt engine generating formatting requirements and categories from a speech input.

As shown in FIG. 4A, the system can also generate fine-tuning data that is based on characteristics of the user's voice. In this embodiment, the end user provides an unformatted speech input to generate a document having a format and categories that are derived from the speech input. The system also detects gestures, such as volume changes and inflections to prioritize categories and formatting requirements. In the example shown in FIG. 4A, the user had raised their voice while describing a particular topic. The system interprets this change in the user's voice as an emphasis in priority for an associated topic. Thus, in response, the system generates formatting requirements indicating that the corresponding category, "Forward," is a high priority and is to be positioned at the top of the document. The system can then format the corresponding category with emphasis and/or rank the corresponding category ahead of other categories. Also shown, the system also identifies and records other categories detected in the voice input.

Figure 4B:
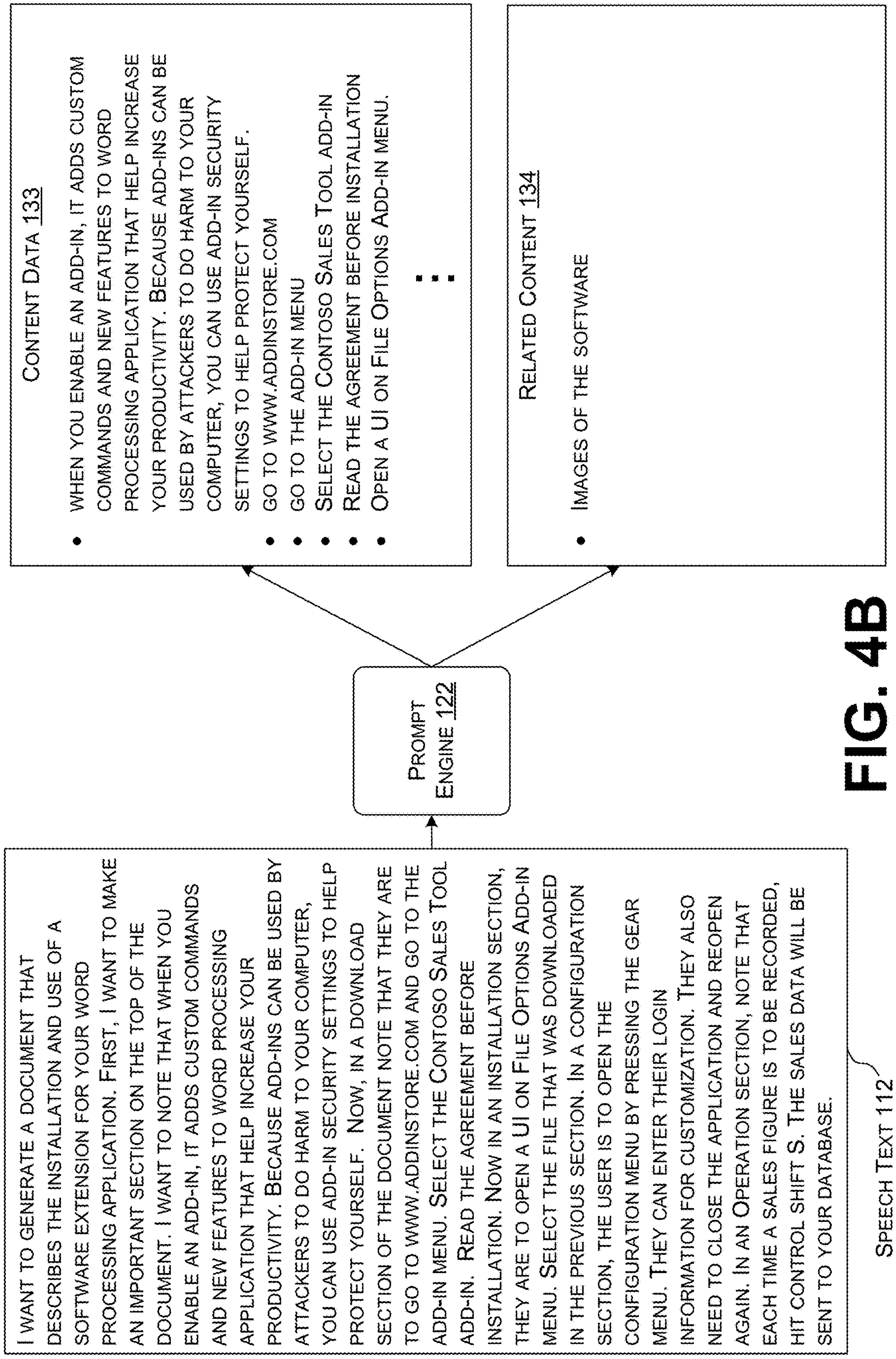
FIG. 4B shows aspects of a prompt engine generating select content and related content from a verbal input.

FIG. 4B shows on the document contents are derived from the speech text. For example, the system may identify specific steps on how to operate a software application, prerequisites for running the software application, etc. This can be achieved by identifying individual sections of select content 133 that may match with keywords, keyword combinations, or by the use of instructions a large language model. For example, the system may provide the speech text 112 to a large language model along with instructions to identify operating steps or prerequisites. The large language model can then return the selected sections of content.

The prompt engine can also identify a need for additional information that was not mentioned in the speech input, generate queries for the additional information and retrieve the related content in response to those queries. The additional information can be stored as related content 134.

The prompt engine 122 can also identify additional categories from the unstructured verbal narrative. For example, the system may determine categories from the end user's speech. For example, if the end user stated they want a Conclusion section, the system can add additional categories to the category list at this stage. In this example, the prompt engine 122 also retrieves other related content 134 from other resources, such as an image to the software application.

Figure 4C:
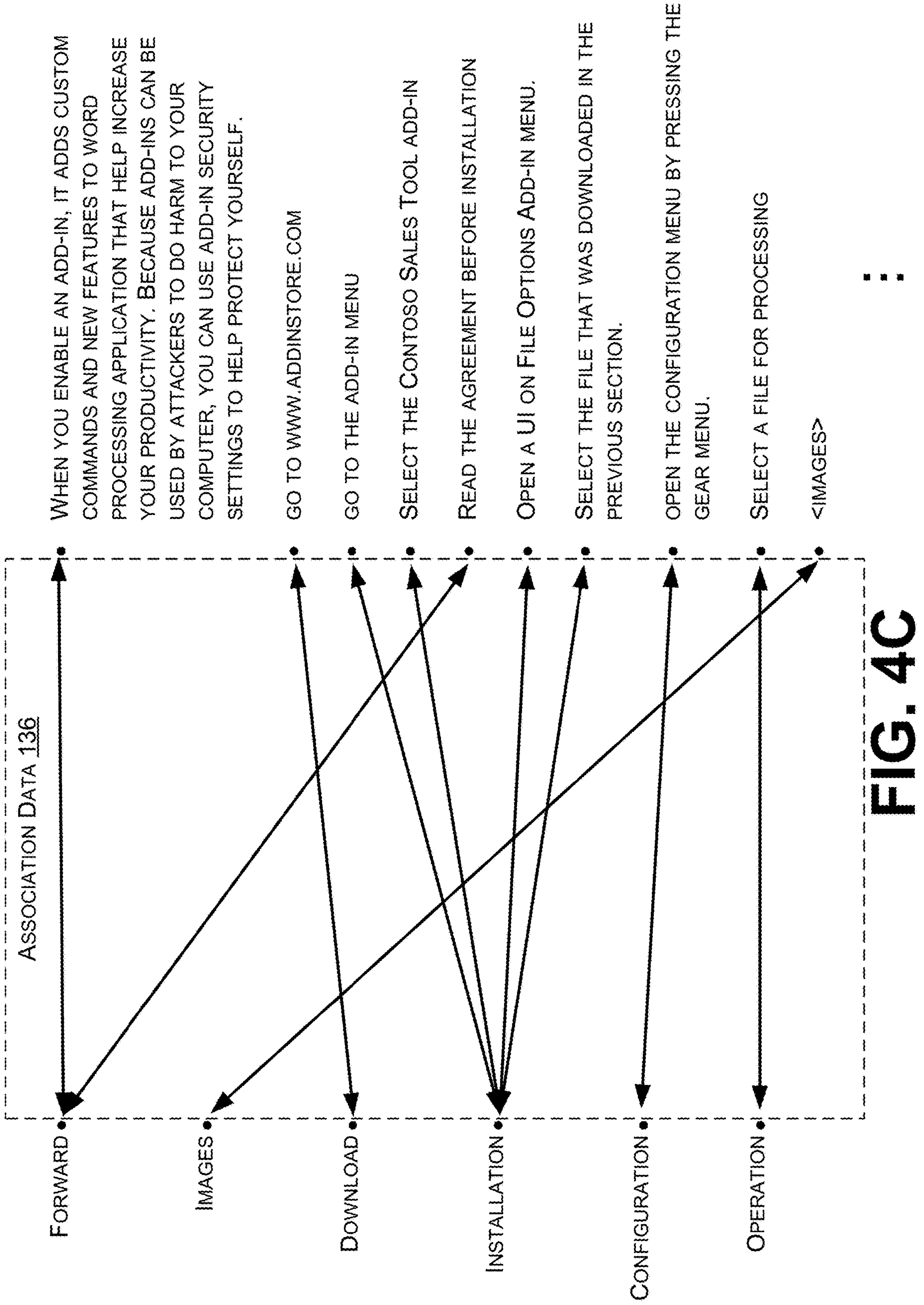
FIG. 4C shows aspects of associated data that can be generated from verbal input and determined categories.

As shown in FIG. 4C, the system associates identified content with the determined categories. Similar to the example described above, the prompt engine may analyze each section of the selected content and determine the relevancy of each section with respect to a category. In this example, the special notification text dictated by the end user is associated with the "Forward" category, the instruction of the Web site is associated with the "Download" category, etc.

Figure 4D:
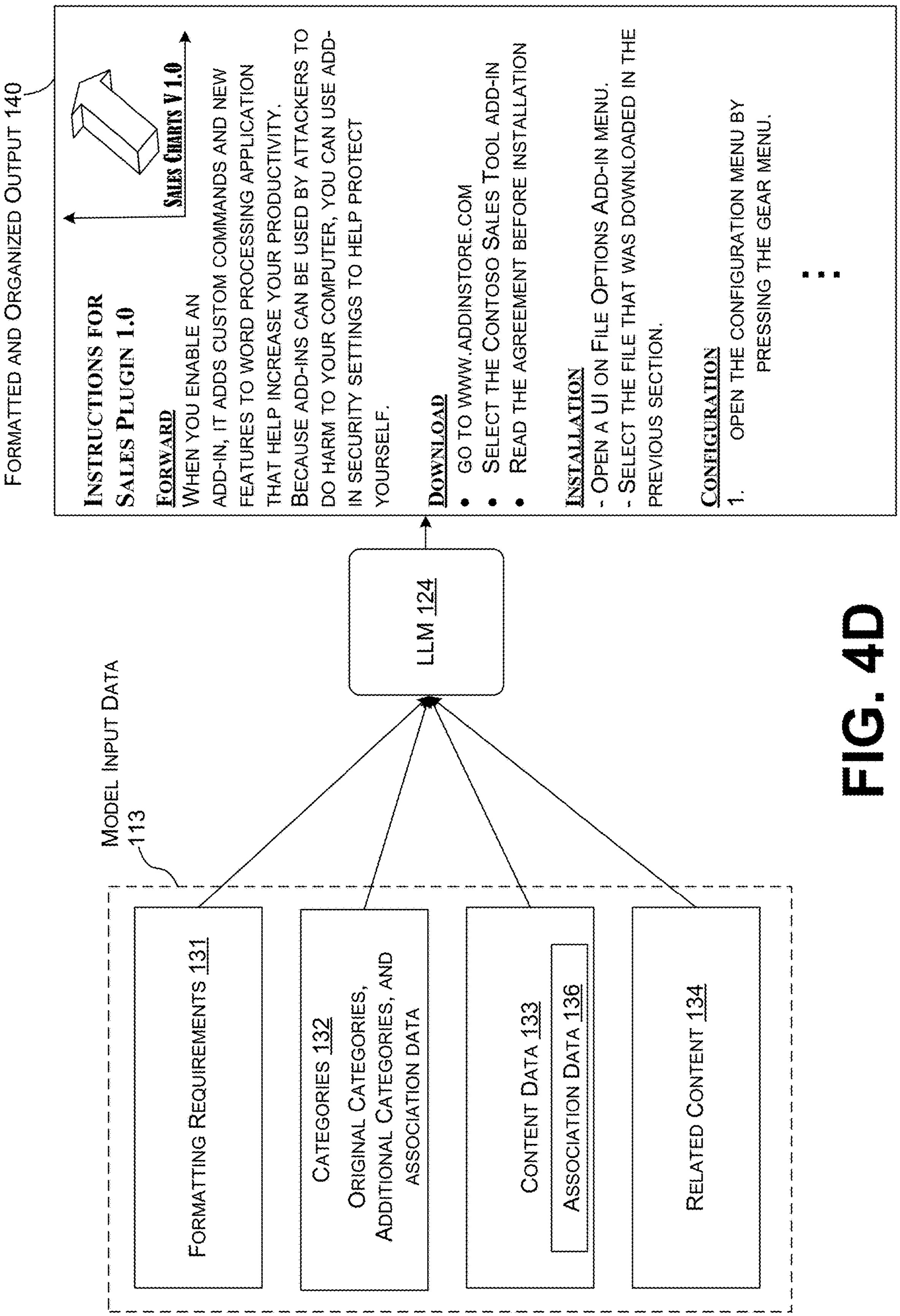
FIG. 4D shows a large language model used for generating a formatted document.

As shown in FIG. 4D, the system provides the model input data 113 to the large language model 124, which causes the large language model 124 to generate the formatted output 140. As shown, the output 140 follows the format and the categories obtained from the unstructured speech narrative. In this example, large language model 124 receives the one or more formatting requirements 131 identified from the unstructured speech narrative. This model input data 113 causes the large language model 124 to generate the structured document 140. As shown, the output 140 is in the form of a structured document comprising the individual sections of select content 133 each graphically associated with the one or more categories 132. In addition, the individual sections of select content and the one or more categories are ordered and formatted according to the one or more formatting requirements identified by the analysis of the unstructured speech narrative. Although the formatting requirements are generated by an analysis of the user's voice input, the formatting requirements can also be from other sources. For example, the embodiment of FIG. 3 can also utilize an existing document for causing the system to generate formatting requirements from an existing document, such as the fine-tuning data shown in FIG. 1.

Figure 4E:
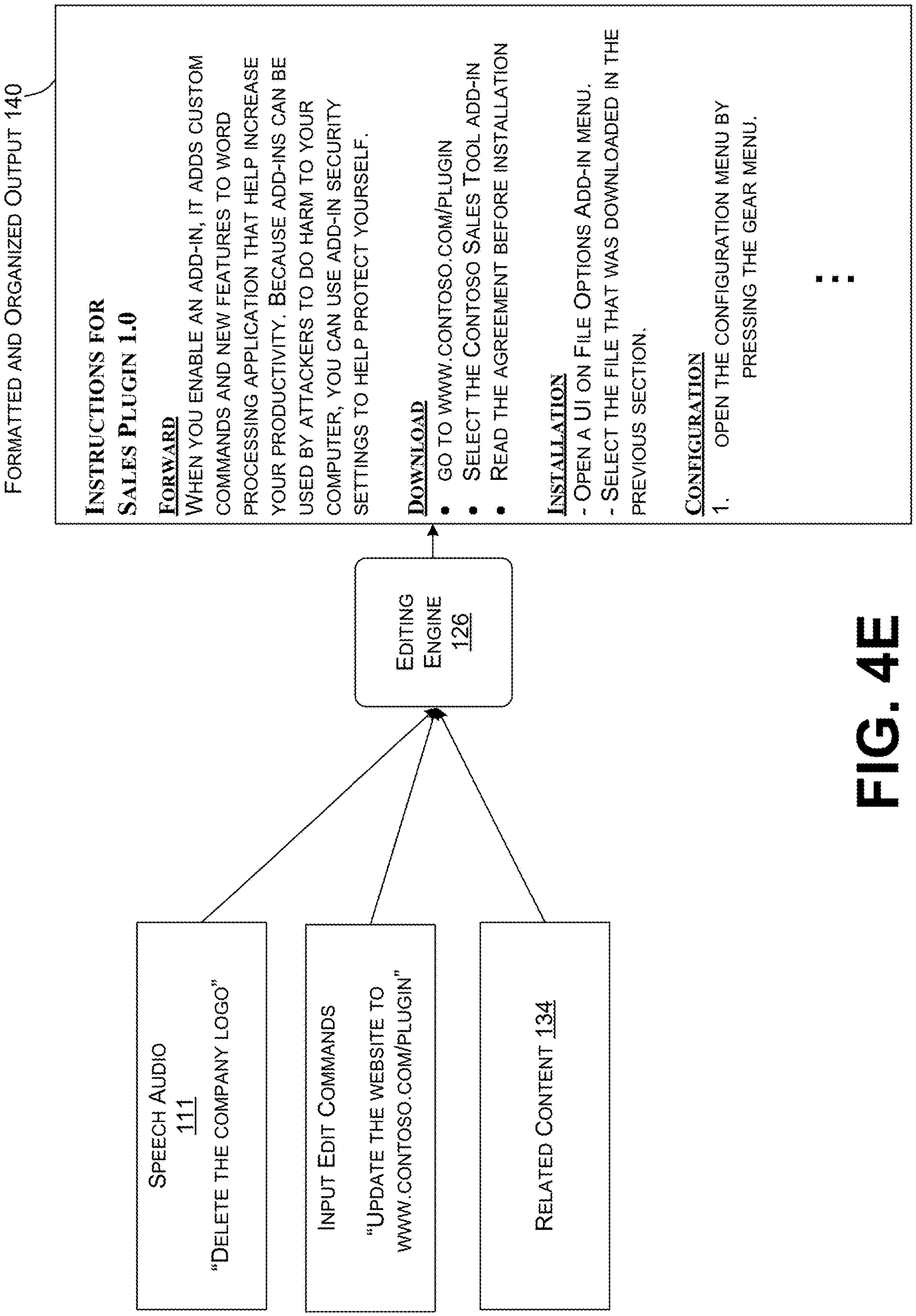
FIG. 4E shows how a formatted document can be edited.

As shown in FIG. 4E, the system can also provide one or more tools that allows the user to edit the file. For example, the end user can edit the content or any of the categories. In this example, the user has removed the logo and updated the Web site links. These edits can be also used to modify the formatting requirements 131 and/or the categories 132. Thus, the system can continually learn from the user's edits so that the system can generate future documents from other verbal narrative inputs while maintaining a consistent format across all future documents.

Any of the described features can be combined to generate formatted documents from a natural language speech input. For instance, the system can receive a formatted document as pre-training data and also generate formatting requirements and categories from speech input. Such combinations of inputs, e.g., pre-training documents, natural language speech, and gestures conveyed in the speech, such as inflections in a person's voice or tone changes, can be used by a system to identify formatting requirements, content, categories, additional categories, or queries for related content.

Figure 5:
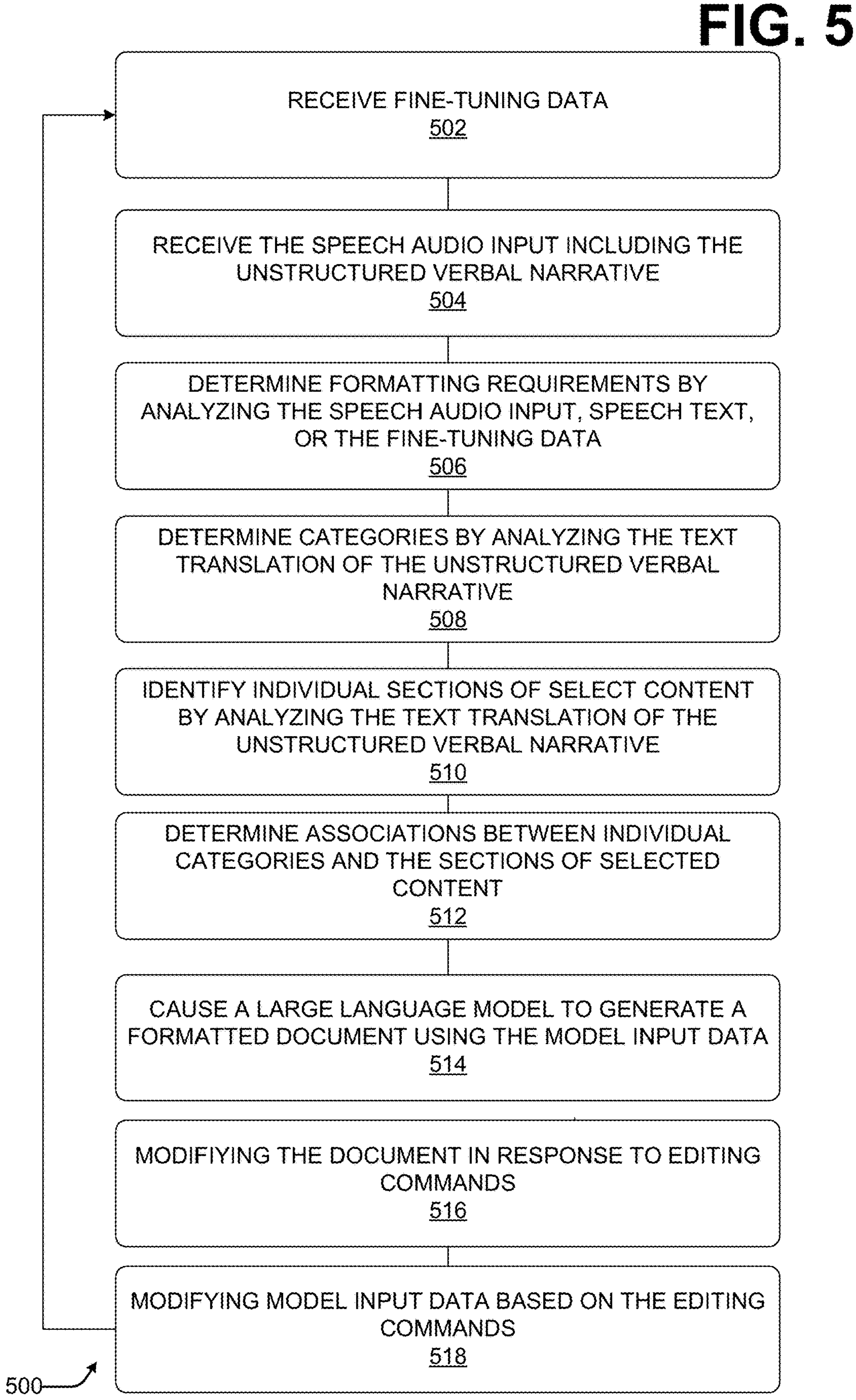
FIG. 5 is a flow diagram showing aspects of a routine for utilizing the network effect of end-user viral adoption of services and applications by clustering users based on characteristics of requests to configure new tenants.

Turning now to FIG. 5, aspects of a routine 500 for generating a structured document 140 from a speech audio input 111 comprising an unstructured verbal narrative 109 using a large language model 124 is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 200 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

At operation 502, the system receives fine-tuning data. The fine-tuning data can be in the form of an existing document that has a desired format, layout and organization. For instance, the fine-tuning data can be an existing document with instructions on how to install and operate a software application. This will be used by the system as pre-training data to teach the system a format to use when generating a document based on a natural language input. The fine-tuning data can be provided by a computer associated with a system trainer or a system administrator.

At operation 504, the system receives a speech audio input and converts the speech audio input into a text translation. The speech audio input can be received at a microphone at a computing device of an end user.

At operation 506, the system determines formatting requirements by analyzing the speech audio input, speech text, or the fine-tuning data. This operation determines the one or more formatting requirements 131 based on the use of keywords detected in the speech input, a volume of a speech input, voice inflections, speech tone, or other speech characteristics. The formatting requirements can also be based on a format or layout of fine-tuning data, such as an example document. The formatting requirements can also be based on formatting requirements that are derived from previous iterations of this routine. Since this system is a learning process, the system can adjust formatting requirements in each iteration of this routine 500, and constantly fine tune the formatting requirements based on any of the inputs described herein.

At operation 508, the system determines categories by analyzing the text translation of the unstructured verbal narrative. Categories can also be determined by the analysis of the fine-tuning data. The categories are topics to be used as headers for sections of the output file. The categories can be identified by keywords, emphasized keywords and a speech input, and/or emphasized words in the fine-tuning data, e.g., words having large font, in bold text, etc.

At operation 510, the system determines individual sections of select content by analyzing the text translation of the unstructured verbal narrative. This can include the identification of sections of text that describe operations, steps, items, materials, or any other content related to the categories.

At operation 512, the system determines associations between individual categories and the sections of selected content. This can be done by the use of keywords or other relevancy scoring techniques that indicate a relationship between a category and identified content.

At operation 514, the system causes a large language model to generate a formatted document using the model input data. The model input data can include the formatting requirements, categories, the selected content and the association data.

At operation 516, the system causes a modification to the formatted document in response to editing commands. The system receive keyboard commands, voice commands, or other forms of input that indicate edits to the document. Those commands can modify the formatted document, including but not limited to the selected content, the categories or a format property.

At operation 518, the system causes a modification model input data based on the editing commands. This can include modifications to the formatting requirements and categories, in response to commands that cause modifications to the formatting requirements and categories. This modified version of the model input data can be used in future iterations of the routine.

Figure 6:
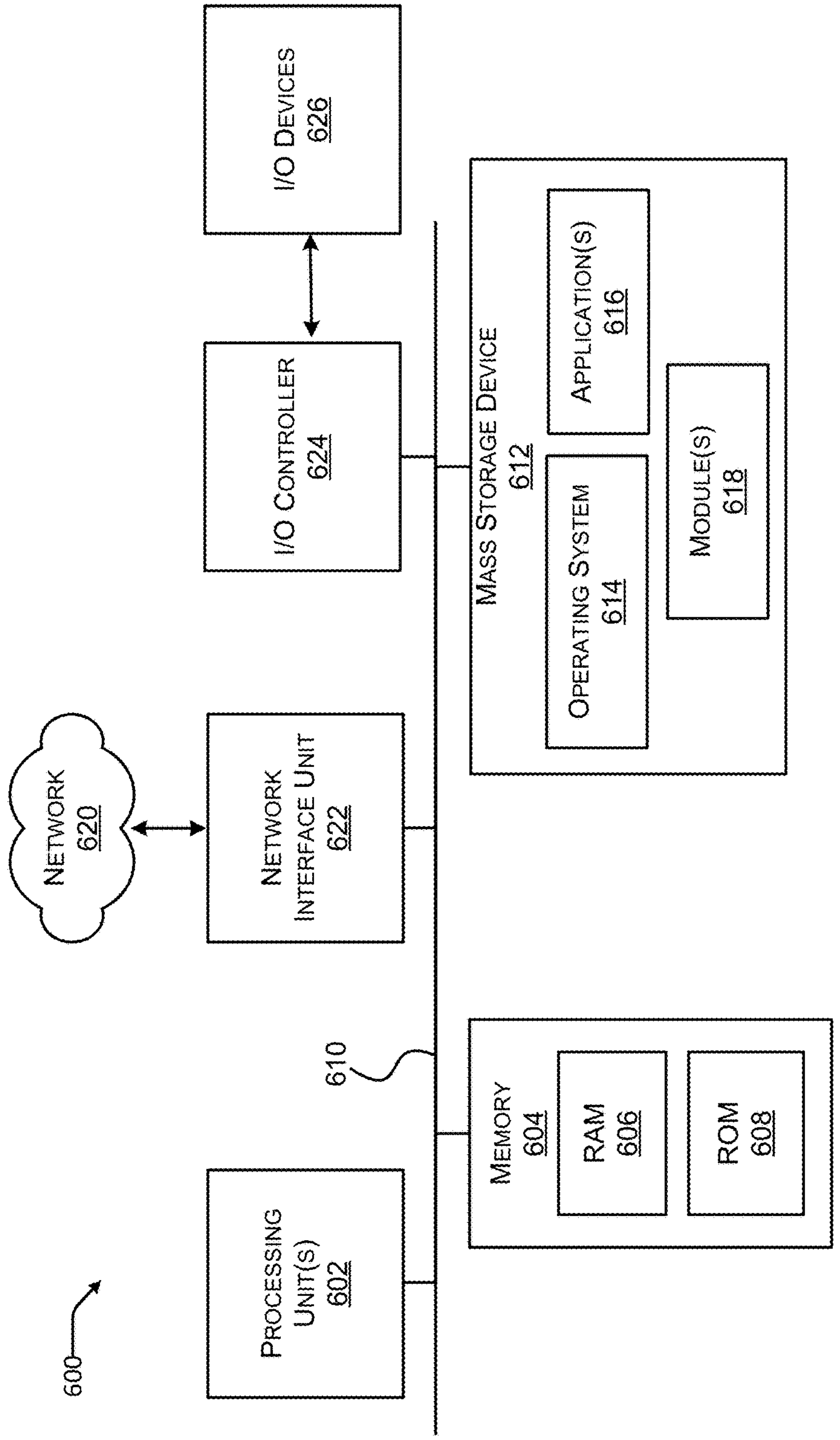
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
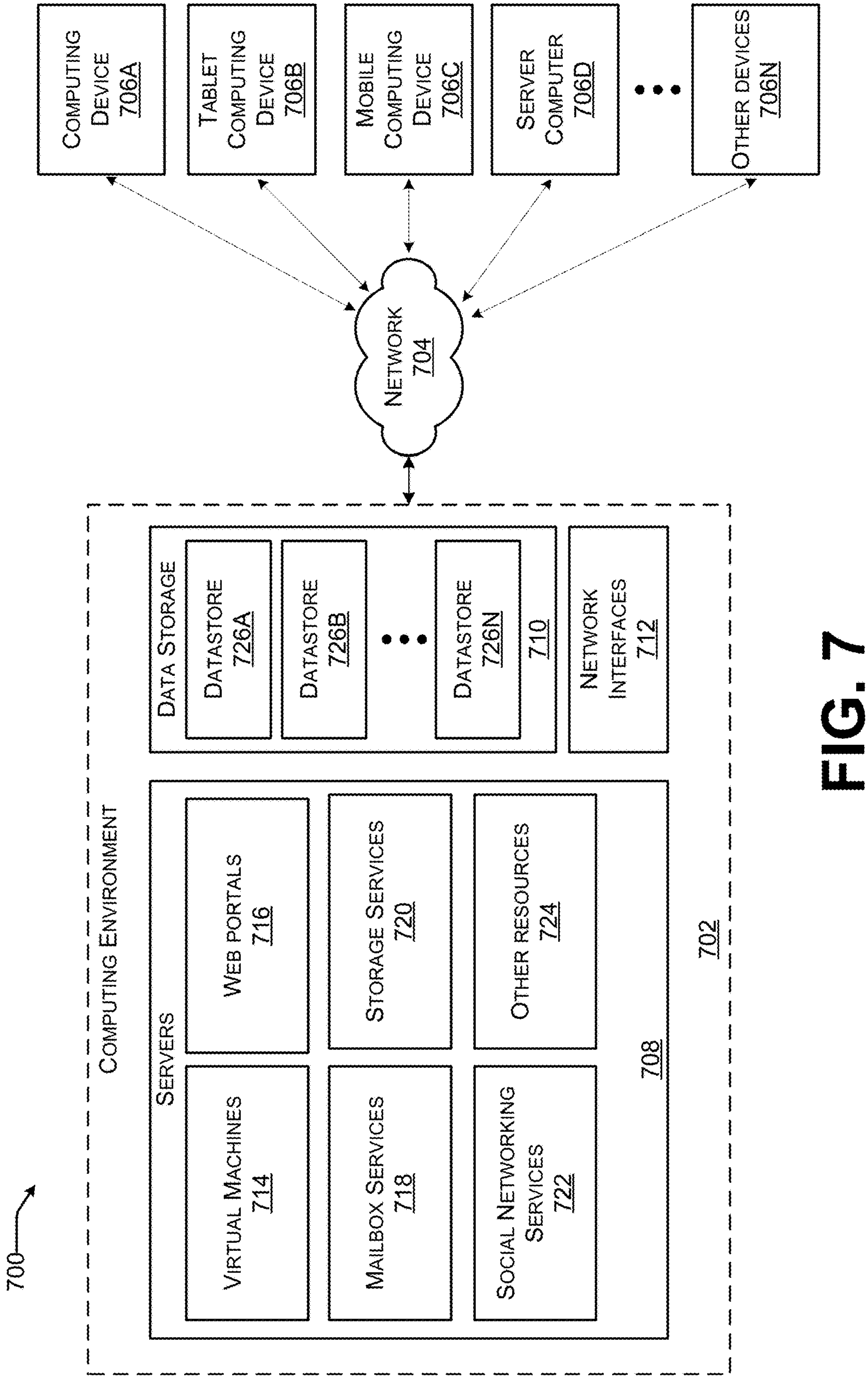
FIG. 7 is a computer architecture diagram illustrating a computing device architecture for a computing device capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different audio inputs).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method of generating a structured document from a speech audio input comprising an unstructured verbal narrative using a large language model, the method for execution on a computing system, the method comprising:

receiving fine-tuning data having a layout that follows one or more formatting requirements, the fine-tuning data comprising individual sections of content associated with individual categories;

determining the one or more formatting requirements by analyzing the fine-tuning data, wherein the analysis determines the one or more formatting requirements based on a format or a layout of the content of the fine-tuning data;

receiving the speech audio input at a microphone in communication with the computing system, the speech audio input including the unstructured verbal narrative;

analyzing the speech audio input to determine speech characteristics that include at least one of a volume of the voice, a tone of voice, and one or more inflections of a voice included in the speech audio input;

converting the speech audio input including the unstructured verbal narrative into a text translation of the unstructured verbal narrative;

determining one or more categories by analyzing the text translation of the unstructured verbal narrative;

identifying individual sections of select content by analyzing the text translation of the unstructured verbal narrative, wherein the individual sections of select content are associated with individual categories of the one or more categories;

modifying the one or more formatting requirements based on the speech characteristics, wherein at least one of the volume of the voice, the tone of the voice, and one or more inflections of a voice modifies as least one of an order of the individual sections or a format of the individual sections; and providing the one or more formatting requirements identified from the fine-tuning data, the one or more categories, and the individual sections of select content identified from the text translation of the unstructured verbal narrative to the large language model for causing the large language model to generate the structured document, wherein the structured document comprises the individual sections of select content each associated with the one or more categories, wherein the individual sections of select content and the one or more categories are ordered and formatted according to the one or more formatting requirements identified by the analysis of the fine-tuning data and the speech characteristics that include at least one of the volume, the tone of voice, and the one or more inflections of the voice included in the speech audio input.

2. The method of claim 1, further comprising:

analyzing the fine-tuning data to identify additional categories, wherein the additional categories do not include categories identified in the unstructured verbal narrative;

associating content selected from the unstructured verbal narrative with the additional categories; and providing the additional categories and the associated content to the large language model to supplement the one or more categories and the individual sections of select content for causing the large language model to generate the structured document comprising the additional categories with the one or more categories and the individual sections of select content.

3. The method of claim 1, further comprising:

analyzing the fine-tuning data and the unstructured verbal narrative to identify references to supplement the select content, wherein the references have a threshold level of relevancy to the select content;

generating a query for one or more resources for retrieving the additional resources;

sending the query to the one or more resources, causing the one or more resources to return the references; and providing the references to the large language model for causing the large language model to integrate the references into the structured document.

4. The method of claim 1, further comprising:

receiving supplemental inputs from a computing device associated with an end user to modify the structured document, wherein the supplemental inputs defining modifications to the sections of select content or the one or more categories of the structured document;

causing a modification to the structured document based on the modifications to the sections of select content or the one or more categories; and updating model input data defining the one or more categories or the one or more categories, for causing the large language model to modify a layout of future structured documents generated by the large language model.

5. The method of claim 1, further comprising:

receiving supplemental inputs from a computing device associated with an end user, the supplemental inputs defining modifications to a layout of the structured document, modifications to the sections of select content, or modifications to the one or more categories;

causing a modification to the structured document based on the modifications to the sections of select content or the one or more categories; and updating model input data defining the one or more formatting requirements or the one or more categories for causing the large language model to modify a layout of future structured documents generated by the large language model in response to receiving additional speech audio inputs defining unstructured verbal narrative, wherein updates to the model input data are restricted for the supplemental inputs only include modifications to the sections of select content, wherein updates to the formatting requirements of the model input data are allowed for supplemental inputs defining modifications to the layout of the structured document.

6. The method of claim 1, wherein the fine-tuning data is received from a first remote computing device associated with an administrator with access rights to modify model input data, wherein the speech audio input is received at the microphone in communication with a second remote computing device associated with an end user.

7. The method of claim 1, wherein the structured document comprises explanations that are ordered according to an order of associated categories, wherein images are positioned and sized according to the one or more formatting requirements.

8. The method of claim 1, further comprising:

generating one or more category requirements defining a priority of individual categories or an order of individual categories; and providing the one or more category requirements to the large language model for causing the large language model to control a layout of the formatted document according to the priority of individual categories or the order of individual categories.

9. A computing device for generating a structured document from a speech audio input comprising an unstructured verbal narrative using a large language model, the computing device comprising:

one or more processing units; and a computer-readable storage medium having encoded thereon computer-executable instructions to cause the one or more processing units to:

receive fine-tuning data having a layout that follows one or more formatting requirements, the fine-tuning data comprising individual sections of content associated with individual categories;

determine the one or more formatting requirements by analyzing the fine-tuning data, wherein the analysis determines the one or more formatting requirements based on a format or a layout of the content of the fine-tuning data;

receive the speech audio input at a microphone in communication with the computing system, the speech audio input including the unstructured verbal narrative;

analyze the speech audio input to determine speech characteristics that include at least one of a volume of the voice, a tone of voice, and one or more inflections of a voice included in the speech audio input and using the speech characteristics to supplement the one or more formatting requirements;

convert the speech audio input including the unstructured verbal narrative into a text translation of the unstructured verbal narrative;

determine one or more categories by analyzing the text translation of the unstructured verbal narrative;

identify individual sections of select content by analyzing the text translation of the unstructured verbal narrative, wherein the individual sections of select content are associated with individual categories of the one or more categories;

modify the one or more formatting requirements based on the speech characteristics, wherein at least one of the volume of the voice, the tone of the voice, and one or more inflections of a voice modifies as least one of an order of the individual sections or a format of the individual sections; and provide the one or more formatting requirements identified from the fine-tuning data, the one or more categories, and the individual sections of select content identified from the text translation of the unstructured verbal narrative to the large language model for causing the large language model to generate the structured document, wherein the structured document comprises the individual sections of select content each associated with the one or more categories, wherein the individual sections of select content and the one or more categories are ordered and formatted according to the one or more formatting requirements identified by the analysis of the fine-tuning data and the speech characteristics that include at least one of the volume, the tone of voice, and the one or more inflections of the voice included in the speech audio input.

10. The computing device of claim 9, further comprising:

analyzing fine-tuning data to identify additional categories, wherein the additional categories do not include categories identified in the unstructured verbal narrative;

associating content selected from the unstructured verbal narrative with the additional categories; and providing the additional categories and the associated content to the large language model to supplement the one or more categories and the individual sections of select content for causing the large language model to generate the structured document comprising the additional categories with the one or more categories and the individual sections of select content.

11. The computing device of claim 9, further comprising:

analyzing fine-tuning data and the unstructured verbal narrative to identify references to supplement the select content, wherein the references have a threshold level of relevancy to the select content;

generating a query for one or more resources for retrieving the additional resources;

sending the query to the one or more resources, causing the one or more resources to return the references; and providing the references to the large language model for causing the large language model to integrate the references into the structured document.

12. The computing device of claim 9, further comprising:

receiving supplemental inputs from a computing device associated with an end user to modify the structured document, wherein the supplemental inputs defining modifications to the sections of select content or the one or more categories of the structured document;

causing a modification to the structured document based on the modifications to the sections of select content or the one or more categories; and updating model input data defining the one or more categories or the one or more categories, for causing the large language model to modify a layout of future structured documents generated by the large language model.

13. The computing device of claim 9, further comprising:

receiving supplemental inputs from a computing device associated with an end user, the supplemental inputs defining modifications to a layout of the structured document, modifications to the sections of select content, or modifications to the one or more categories;

causing a modification to the structured document based on the modifications to the sections of select content or the one or more categories; and updating model input data defining the one or more formatting requirements or the one or more categories for causing the large language model to modify a layout of future structured documents generated by the large language model in response to receiving additional speech audio inputs defining unstructured verbal narrative, wherein updates to the model input data are restricted for the supplemental inputs only include modifications to the sections of select content, wherein updates to the formatting requirements of the model input data are allowed for supplemental inputs defining modifications to the layout of the structured document.

14. The computing device of claim 9, wherein the structured document comprises explanations that are ordered according to an order of associated categories, wherein images are positioned and sized according to the one or more formatting requirements.

15. The computing device of claim 9, further comprising:

generating one or more category requirements defining a priority of individual categories or an order of individual categories; and providing the one or more category requirements to the large language model for causing the large language model to control a layout of the formatted document according to the priority of individual categories or the order of individual categories.

16. A method of generating a structured document from a speech audio input comprising an unstructured verbal narrative using a large language model, the method for execution on a computing system, the method comprising:

receiving fine-tuning data having a layout that follows one or more formatting requirements, the fine-tuning data comprising individual sections of content associated with individual categories;

determining the one or more formatting requirements by analyzing the fine-tuning data, wherein the analysis determines the one or more formatting requirements based on a format or a layout of the content of the fine-tuning data;

receiving the speech audio input at a microphone in communication with the computing system, the speech audio input including the unstructured verbal narrative;

analyzing the speech audio input to determine speech characteristics that include at least one of a volume, a tone of voice, and one or more inflections of a voice included in the speech audio input;

determining, based on the speech characteristics, a priority level for one or more portions of the unstructured verbal narrative;

converting the speech audio input including the unstructured verbal narrative into a text translation of the unstructured verbal narrative;

determining one or more categories by analyzing the text translation of the unstructured verbal narrative;

identifying individual sections of select content by analyzing the text translation of the unstructured verbal narrative, wherein the individual sections of select content are associated with individual categories of the one or more categories;

assigning the priority level to one or more of the individual sections of select content or the categories based on the corresponding portions of the speech audio input from which the individual sections of select content were derived; and providing the one or more formatting requirements identified from the fine-tuning data, the one or more categories, the individual sections of select content identified from the text translation of the unstructured verbal narrative, and the priority level determined from the speech characteristics to the large language model for causing the large language model to generate the structured document, wherein the structured document comprises the individual sections of select content each associated with the one or more categories, and wherein the large language model orders or emphasizes the individual sections of select content or the categories in the structured document based at least in part on the priority level determined from the speech characteristics in addition to the formatting requirements identified from the analysis of the fine-tuning data.

17. The method of claim 16, wherein the large language model is capable of processing both text input and speech input, wherein the text input and speech input is used for generating the individual sections of select content, and at least one of the speech input or text input is further used to determine the speech characteristics.

18. The method of claim 16, further comprising:

analyzing the fine-tuning data to identify additional categories, wherein the additional categories do not include categories identified in the unstructured verbal narrative;

associating content selected from the unstructured verbal narrative with the additional categories; and providing the additional categories and the associated content to the large language model to supplement the one or more categories and the individual sections of select content for causing the large language model to generate the structured document comprising the additional categories with the one or more categories and the individual sections of select content.

19. The method of claim 16, further comprising:

analyzing the fine-tuning data and the unstructured verbal narrative to identify references to supplement the select content, wherein the references have a threshold level of relevancy to the select content;

generating a query for one or more resources for retrieving the additional resources;

sending the query to the one or more resources, causing the one or more resources to return the references; and providing the references to the large language model for causing the large language model to integrate the references into the structured document.

20. The method of claim 16, further comprising:

receiving supplemental inputs from a computing device associated with an end user to modify the structured document, wherein the supplemental inputs defining modifications to the sections of select content or the one or more categories of the structured document;

causing a modification to the structured document based on the modifications to the sections of select content or the one or more categories; and updating model input data defining the one or more categories or the one or more categories, for causing the large language model to modify a layout of future structured documents generated by the large language model.

* * * * *